(12) United States Patent
Hung

(10) Patent No.: US 7,779,511 B2
(45) Date of Patent: Aug. 24, 2010

(54) HINGE ASSEMBLY

(75) Inventor: Shun-Yu Hung, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 442 days.

(21) Appl. No.: 12/006,341

(22) Filed: Jan. 2, 2008

(65) Prior Publication Data

US 2009/0165249 A1 Jul. 2, 2009

(51) Int. Cl.
  *E05D 3/10* (2006.01)
(52) U.S. Cl. ........................................... 16/367
(58) Field of Classification Search .............. 16/367, 16/337–339, 342, 330, 303, 340; 361/679.06, 361/679.07, 679.27; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS 6,742,221 B2 *  6/2004  Lu et al. .................... 16/367
6,804,861 B2 * 10/2004  Hsu ........................... 16/366
6,883,206 B2 *  4/2005  Yang et al. .................. 16/337
7,055,218 B2 *  6/2006  Lu et al. ..................... 16/367
7,513,013 B2 *  4/2009  Hsieh ......................... 16/367
2004/0083577 A1 *  5/2004  Lu et al. ..................... 16/367
2005/0207104 A1 *  9/2005  Love ......................... 361/683
2008/0078060 A1 *  4/2008  Chen ......................... 16/367
2008/0271293 A1 * 11/2008  Hsu et al. ................... 16/367
2009/0121094 A1 *  5/2009  Chang et al. .............. 248/125.7

* cited by examiner

*Primary Examiner*—Chuck Y. Mah
(74) *Attorney, Agent, or Firm*—William E. Pelton, Esq.; Cooper & Dunham LLP

(57) ABSTRACT

A hinge assembly is used in a notebook computer and has a rotating bracket, cover panel, stationary bracket, limiting assembly and indicator ring. The notebook computer has a display and a base. The display is rotatably mounted pivotally upon the base. The rotating bracket is attached to the display and has a keyed shaft. The cover panel is mounted around the rotating bracket, is attached to a top surface of the base and has a gap. The stationary bracket is mounted rotatably around the keyed shaft and is mounted securely on the base. The limiting assembly is mounted on the stationary bracket and allows the keyed shaft to rotate 360°. The indicator ring is mounted on the limiting assembly and has two indicators. The indicators show up in the gap when the display is rotated to a rotational limitation to indicate direction of allowed rotation.

5 Claims, 6 Drawing Sheets

HINGE ASSEMBLY

BACKGROUND OF THE INVENTION

1. Field of the Invention

The present invention relates to a hinge assembly, and more particularly to a hinge assembly attaching a display to a base of a notebook computer.

2. Description of the Prior Arts

Notebook computers are designed to be more and more convenient and to have structural features to add preferred operational functions.

One type of conventional hinge allows a display of the notebook computer horizontally rotating relative to its base to provide a function to exhibit or to show information on the display located behind the notebook. However, the conventional hinge does not indicate rotational limitations, therefore users may rotate the display too far and hard, unwittingly striking a rotational limit and causing damage to the notebook computer. More damage may also be caused by rotating the conventional hinge to the rotational limit for use and then trying to force the conventional hinge against this to return to normal operations.

To overcome the shortcomings, the present invention provides a hinge assembly to mitigate or obviate the aforementioned problems.

SUMMARY OF THE INVENTION

The primary objective of the present invention is to provide a hinge assembly that indicates when a display of a notebook computer reaches its rotational limitation.

The hinge assembly is used in the notebook computer and has a rotating bracket, cover panel, stationary bracket, limiting assembly and indicator ring. The notebook computer comprises the display and a base. The display is rotatably mounted pivotally upon the base. The rotating bracket is attached to the display and has a keyed shaft. The cover panel is mounted around the rotating bracket, is attached to a top surface of the base and has a gap. The stationary bracket is mounted rotatably around the keyed shaft and is mounted securely on the base. The limiting assembly is mounted on the stationary bracket and allows the keyed shaft to rotate 360°. The indicator ring is mounted on the limiting assembly and has two indicators. The indicators show up in the gap when the display is rotated to the rotational limitation to indicate direction of allowed rotation.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
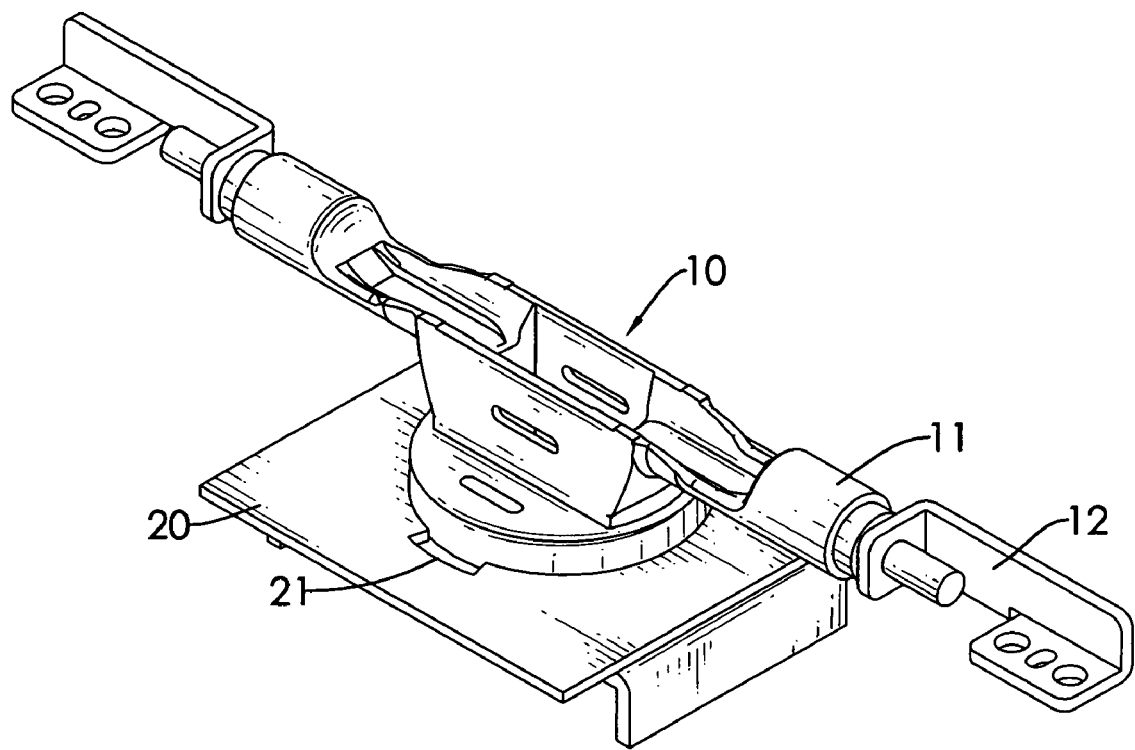
FIG. 1 is a perspective view of a hinge assembly in accordance with the present invention.
Figure 2:
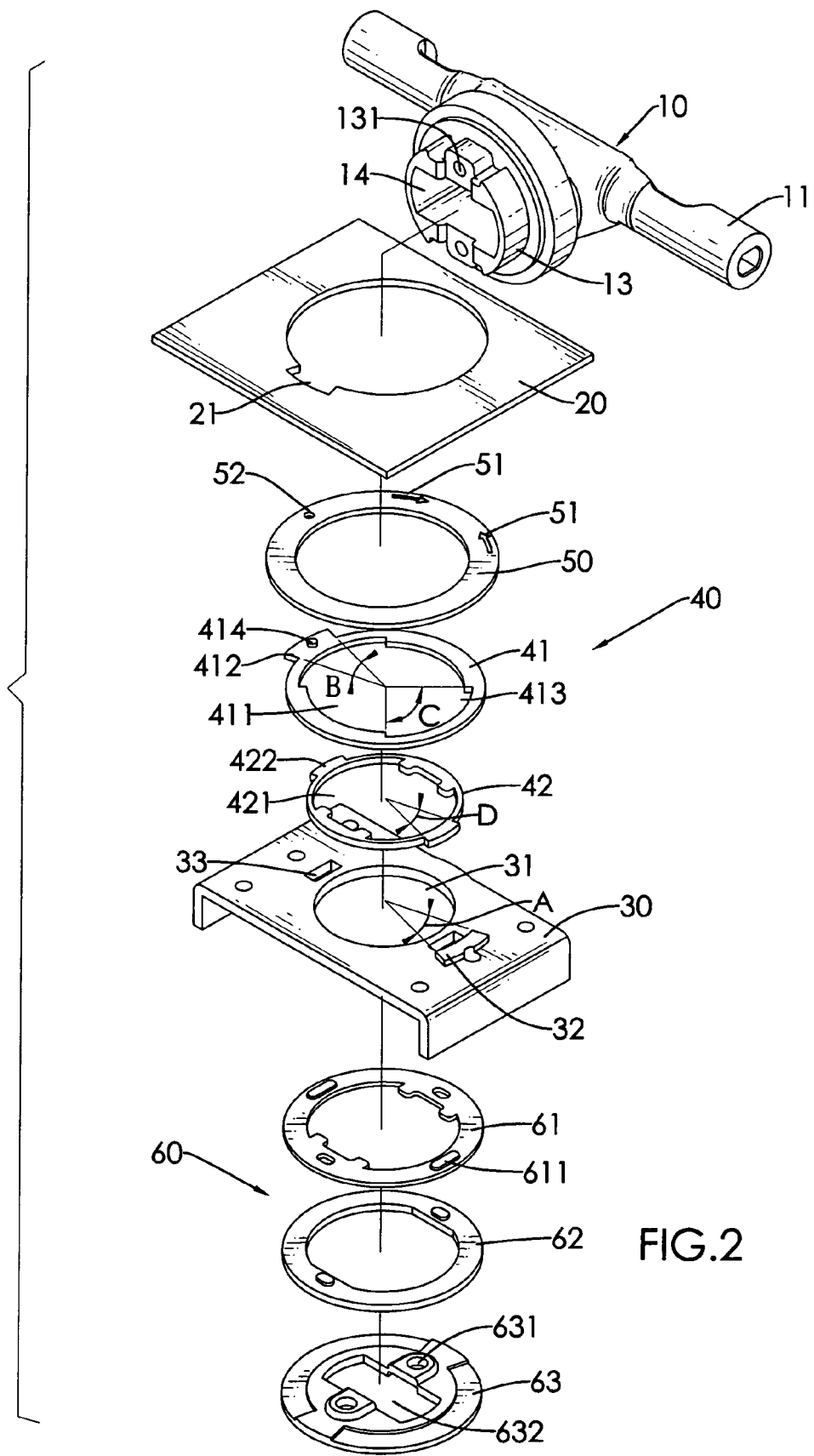
FIG. 2 is an exploded perspective view of the hinge assembly in FIG. 1.

With reference to FIGS. 1 and 2, a hinge assembly in accordance with the present invention is used in a notebook computer comprising a display and a base to allow the display to pivot and rotate relative to the base. The hinge assembly comprises a rotating bracket (10), a cover panel (20), a stationary bracket (30), a limiting assembly (40), an indicator ring (50) and a biasing assembly (60).

Figure 3:
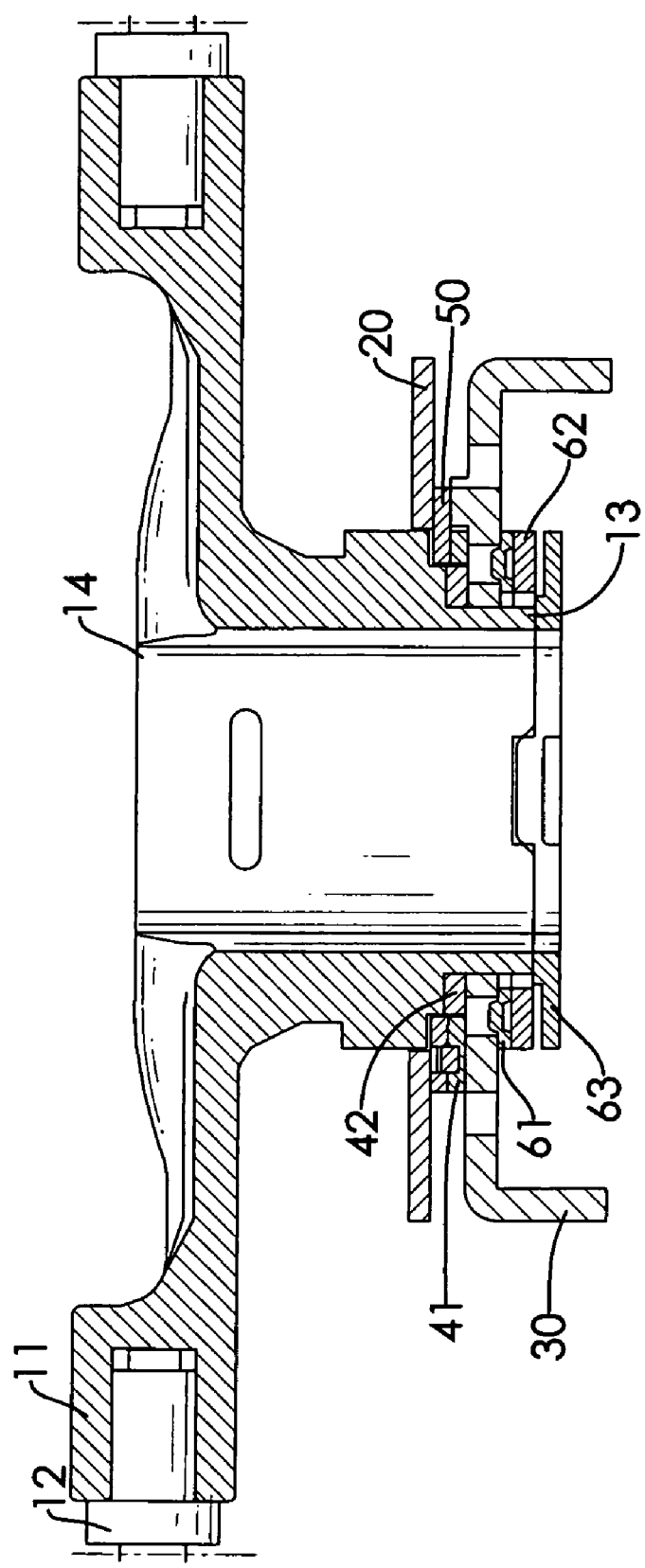
FIG. 3 is a cross-sectional front view of the hinge assembly in FIG. 1.

With further reference to FIG. 3, the rotating bracket (10) is attached to the display of the notebook computer, has two sides, a sidewall, a bottom, two optional pivot arms (11), two optional pivoting mounts (12), a keyed shaft (13) and an optional through hole (14).

The pivot arms (11) are formed respectively on and protrude from the sides of the rotating bracket (10) opposite to each other.

The pivoting mounts (12) are respectively mounted pivotally on the pivot arms (11) and are attached to the display to allow the display to pivot on the pivot arms (11).

The keyed shaft (13) is formed on and protrudes from the bottom of the rotating bracket (10) and has a bottom and at least one optional mounting hole (131). The at least one mounting hole (131) is formed in the bottom of the keyed shaft (13).

The through hole (14) is formed coaxially through the rotating bracket (10).

The cover panel (20) may be an upper surface of the base of the notebook computer, or is formed on an upper surface of the base of the notebook computer, is mounted rotatably around the sidewall of the rotating bracket (10) and has a pivot hole and a gap (21).

The pivot hole is formed through the cover panel (20) and is mounted rotatably around the sidewall of the rotating bracket (10).

The gap (21) is formed through the cover panel (20) adjacent to and communicates with the pivot hole of the cover panel (20).

The stationary bracket (30) is mounted rotatably around the keyed shaft (13), is attached securely to the base of the notebook computer to allow the display to rotate relative to the base, has a top surface, a pivot hole (31) and a limit (32) and may have at least one detent (33).

The pivot hole (31) is formed through the stationary bracket (30) and is mounted rotatably around the keyed shaft (13) and has a center.

The limit (32) is formed on and protrudes from the top surface of the stationary bracket (30), is curved and concentric with the pivot hole (31) of the stationary bracket (30) and has two sides on a sector of a circle that is concentric with the pivot hole (31), the sector having a first angle (A).

Each detent (33) is formed through the stationary bracket (30).

The limiting assembly (40) is mounted rotatably around the keyed shaft (13) against the top surface of the stationary bracket (30), corresponds to and selectively abuts the limit (32) to limit rotation of the display and has a limiting ring (41) and a driving ring (42).

The limiting ring (41) is concentrically mounted rotatably around the keyed shaft (13) against the top surface of the stationary bracket (30) and has an upper surface, an outer edge, a through hole (411), a stop (412), at least one limit notch (413) and an optional connecting boss (414).

The through hole (411) is formed concentrically through the limiting ring (41), is mounted rotatably around the keyed shaft (13) and has an inside edge.

The stop (412) is formed on and protrudes radially from the outer edge of the limiting ring (41), corresponds to and selectively abuts the limit (32) to stop rotation of the hinge and has two sides on a sector of a circle being concentric with the pivot hole (31), the sector having a second angle (B).

The at least one limit notch (413) is formed in the inside edge of the through hole (411), and each of the at least one limit notch (413) has two sides on a sector of a circle concentric with the pivot hole (31), the sector having a third angle (C). The third angle (C) is greater than a sum of the first and second angles (A, B) so satisfies an equation C>A+B.

The connecting boss (414) is formed on and protrudes from the upper surface of the limiting ring (41).

The driving ring (42) is mounted around and engages the keyed shaft (13), is mounted rotatably in the through hole (411) of the limiting ring (41) and has an outer edge, a keyed hole (421) and at least one driving protrusion (422).

The keyed hole (421) is formed concentrically through the driving ring (42) and engages the keyed shaft (13) so the driving ring (42) rotates with the display.

Figure 4:
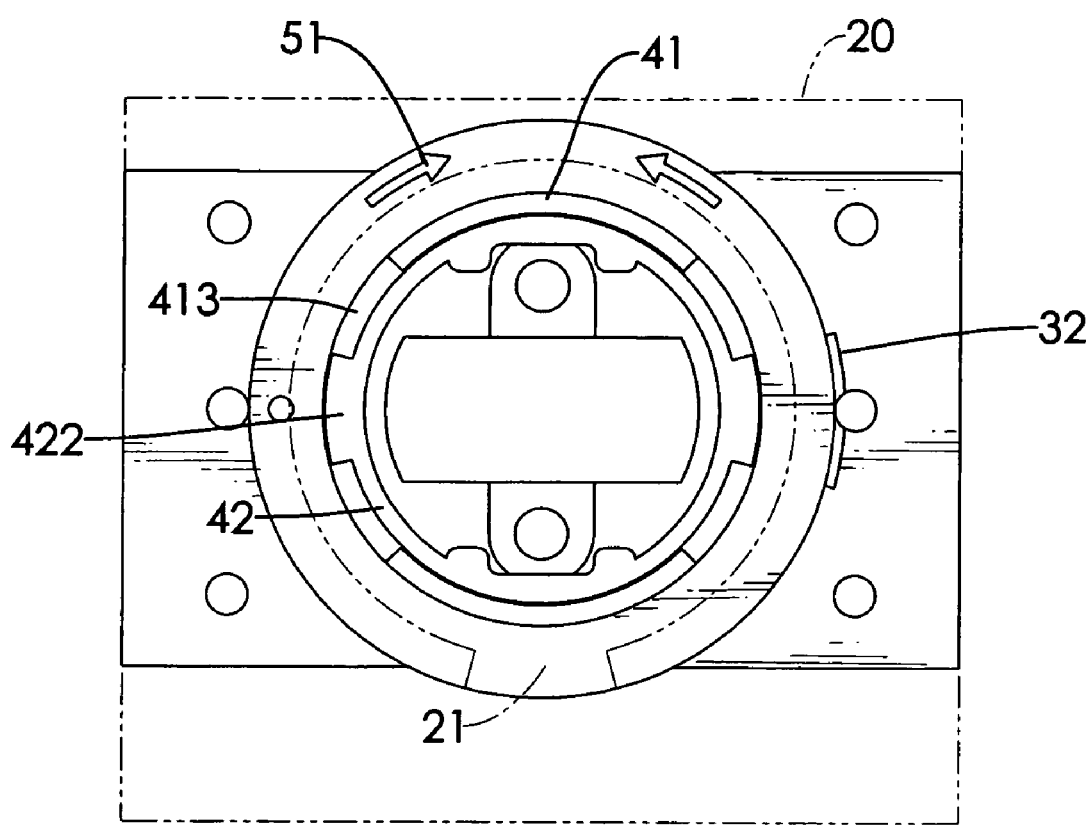
FIGS. 4 to 6 are operational top views of the hinge assembly in FIG. 1 showing the shaft rotating 360° relative to the stationary bracket.
Figure 5:
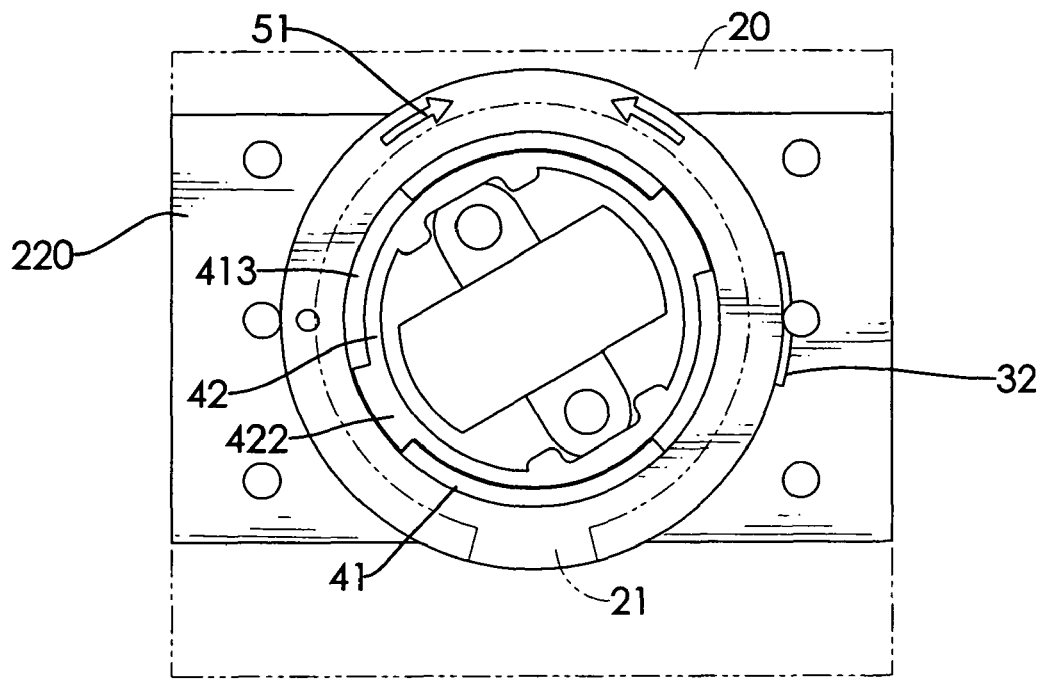
Figure 6:
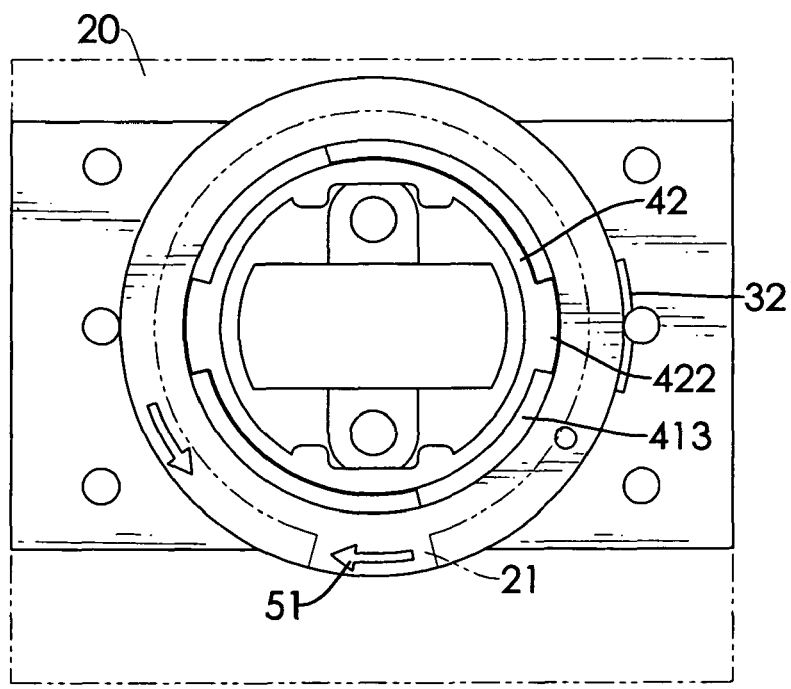

With further reference to FIGS. 4 to 6, the at least one driving protrusion (422) is formed on and protrudes radially from the outer edge of the driving ring (42), corresponds to and is mounted rotatably in the at least one limit notch (413), selectively abuts the sides of the at least one limit notch (413) to rotate the limiting ring (41) and has two sides on a sector of a circle concentric with the pivot hole (31), the sector having a fourth angle (D). A difference between the fourth angle (D) and the third angle (C) is equal to a sum of the first angle (A) and the second angle (B), therefore satisfying an equation C−D=A+B and allowing the rotating bracket (10) to rotate 360°.

The indicator ring (50) is mounted rotatably around the rotating bracket (10) below the cover panel (20), is attached securely to the upper surface of the limiting ring (41), rotates with the limiting ring (41) relative to the cover panel (20) and has an upper surface, two indicators (51) and an optional connecting hole (52).

Figure 7:
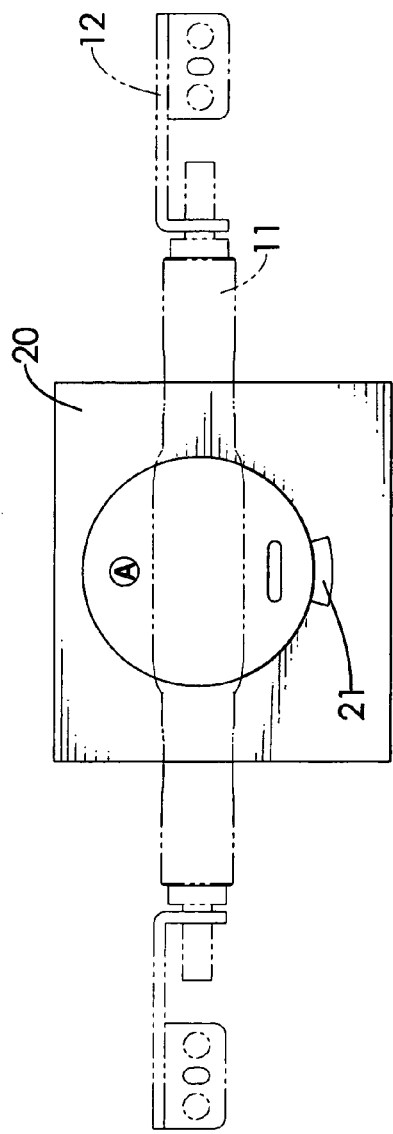
FIGS. 7 and 8 are operational top views of the hinge assembly in FIG. 1 showing the indicators.
Figure 8:
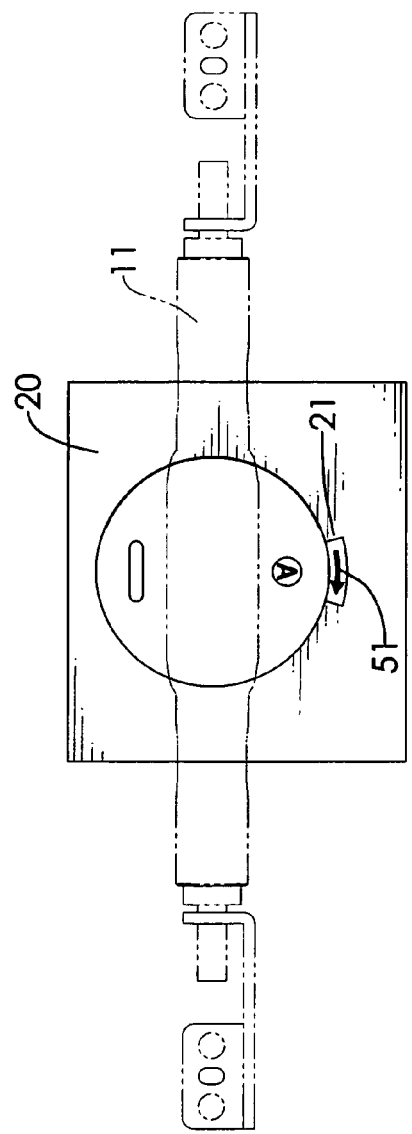

With further reference to FIGS. 7 and 8, the indicators (51) are attached to the upper surface of the indicator ring (50), selectively correspond to the gap (21) of the cover panel (20), and the indicators (51) respectively aligns with the gap (21) when the display is rotated to maximum angle clockwise or counterclockwise so indicates rotation is no longer possible and in which direction to reverse said rotation.

The connecting hole (52) is formed through the indicator ring (50), corresponds to and is mounted around the connecting boss (414) to mount the indicator ring (50) securely on the limiting ring (41).

The biasing assembly (60) is mounted around the sidewall of the keyed shaft (13) near the bottom below the stationary bracket (30), presses the stationary bracket (30) and the limiting assembly (40) to provide resistance to rotation of the hinge assembly and may be implemented with a positioning ring (61), a resilient washer (62) and a mounting seal (63).

The positioning ring (61) is mounted around and engages the keyed shaft (13) below the stationary bracket (30), abuts the stationary bracket (30) and has a top surface and at least one positioning boss (611).

The at least one positioning boss (611) is formed on and protrudes from the top surface of the positioning ring (61) and corresponds to and selectively engaging the corresponding detent (33) to temporarily hold the display in position.

The resilient washer (62) is mounted around the keyed shaft (13) below the positioning ring (61) and is attached to and engages the positioning ring (61).

The mounting seal (63) is mounted securely on the bottom of the keyed shaft (13), press against the resilient washer (62) and has at least one mounting hole (631) and a through hole (632).

The at least mounting hole (631) is formed through the mounting seal (63) and corresponds to the at least one mounting hole (131) in the bottom of the keyed shaft (13).

The through hole (632) of the mounting seal (63) is formed through the mounting seal (63) and aligns with the through hole (14) of the rotating bracket (10) to allow fasteners to be mounted therethrough and hold the hinge assembly together.

Consequently, having the indicators (51) to show up below the gap (21) of the cover panel (20) provides a reminding function when the users have rotated the display to a rotational limitation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge assembly comprising
    a rotating bracket having
        two sides;
        a sidewall;
        a bottom; and
        a keyed shaft being formed on and protruding from the bottom of the rotating bracket and having a bottom; and
    a cover panel being mounted rotatably around the sidewall of the rotating bracket and having
        a pivot hole being formed through the cover panel and being mounted rotatably around the sidewall of the rotating bracket; and
        a gap being formed through the cover panel;
    a stationary bracket being mounted rotatably around the keyed shaft and having
        a top surface;
        a pivot hole being formed through the stationary bracket and being mounted rotatably around the keyed shaft; and
        a limit being formed on and protruding from the top surface of the stationary bracket, being curved and concentric with the pivot hole of the stationary bracket and having two sides on a sector of a circle being concentric with the pivot hole, the sector having a first angle;
    a limiting assembly being mounted rotatably around the keyed shaft against the top surface of the stationary bracket, corresponding to and selectively abutting the limit and having
        a limiting ring being concentrically mounted rotatably around the keyed shaft against the top surface of the stationary bracket and having
            an upper surface;
            an outer edge;
            a through hole being formed concentrically through the limiting ring, being mounted rotatably around the keyed shaft and having an inside edge;
            a stop being formed on and protruding radially from the outer edge of the limiting ring, corresponding to and selectively abutting the limit and having two sides on a sector of a circle being concentric with the pivot hole, the sector having a second angle; and at least one limit notch being formed in the inside edge of the through hole, and each one of the at least one limit notch having two sides on a sector of a circle being concentric with the pivot hole, the sector having a third angle being greater than a sum of the first angle and the second angle; and a driving ring being mounted around and engaging the keyed shaft, being mounted rotatably in the through hole of the limiting ring and having an outer edge;

a keyed hole being formed concentrically through the driving ring and engaging the keyed shaft; and at least one driving protrusion being formed on and protruding radially from the outer edge of the driving ring, and each one of the at least one driving protrusion being mounted rotatably in a corresponding limit notch of the limiting ring, selectively abutting the sides of the corresponding limit notch and having two sides on a sector of a circle being concentric with the pivot hole, the sector having a forth angle;

an indicator ring being mounted rotatably around the rotating bracket below the cover panel, being attached securely to the upper surface of the limiting ring, rotating with the limiting ring relative to the cover panel and having an upper surface; and two indicators being attached to the upper surface of the indicator ring, selectively corresponding to the gap of the cover panel, and the indicators respectively aligning with the gap; and a biasing assembly being mounted around the sidewall of the keyed shaft near the bottom, pressing the stationary bracket and the limiting assembly.

2. The hinge assembly as claimed in claim 1, wherein a difference between the fourth angle and the third angle is equal to a sum of the first angle and the second angle.

3. The hinge assembly as claimed in claim 2, wherein the rotating bracket further has two pivot arms being formed respectively on and protruding from the sides of the rotating bracket opposite to each other;

two pivoting mounts being respectively mounted pivotally on the pivot arms; and a through hole being formed coaxially through the rotating bracket.

4. The hinge assembly as claimed in claim 3, wherein the limiting ring further has a connecting boss being formed on and protruding from the upper surface of the limiting ring; and the indicator ring further has a connecting hole being formed through the indicator ring, corresponding to and being mounted around the connecting boss of the limiting ring.

5. The hinge assembly as claimed in claim 4, wherein the keyed shaft further has at least one mounting hole being formed in the bottom of the keyed shaft;

the stationary bracket further has at least one detent being formed through the stationary bracket; and the biasing assembly further comprises a positioning ring being mounted around and engaging the keyed shaft, abutting the stationary bracket and having a top surface; and at least one positioning boss being formed on and protruding from the top surface of the positioning ring, selectively engaging a corresponding detent of the stationary bracket;

a resilient washer being mounted around the keyed shaft below the positioning ring and being attached to and engaging the positioning ring; and a mounting seal being mounted securely on the bottom of the keyed shaft, pressing against the resilient washer and having at least one mounting hole being formed through the mounting seal and respectively corresponding to the at least one mounting hole of the keyed shaft; and a through hole being formed through the mounting seal and aligning with the through hole of the rotating bracket to allow fasteners to be mounted therethrough and holding the hinge assembly together.

* * * * *